US010310516B2

(12) United States Patent
Nordstrom et al.

(10) Patent No.: US 10,310,516 B2
(45) Date of Patent: Jun. 4, 2019

(54) SYSTEMS AND METHODS FOR YAW CONTROL OF OFFSHORE PLATFORM

(71) Applicant: Makani Technologies LLC, Alameda, CA (US)

(72) Inventors: Charles Joseph Nordstrom, Berkeley, CA (US); Ruth Heffernan Marsh, Bellevue, WA (US)

(73) Assignee: Makani Technologies LLC, Alameda, CA (US)

( * ) Notice: Subject to any disclaimer, the term of this patent is extended or adjusted under 35 U.S.C. 154(b) by 0 days.

(21) Appl. No.: 15/482,766

(22) Filed: Apr. 9, 2017

(65) Prior Publication Data
US 2018/0292843 A1    Oct. 11, 2018

(51) Int. Cl.
G05D 1/08      (2006.01)
B63B 21/50     (2006.01)
B64C 39/02     (2006.01)
B63B 1/04      (2006.01)
B63J 99/00     (2009.01)
B63B 35/44     (2006.01)
B63H 9/06      (2006.01)

(52) U.S. Cl.
CPC .......... G05D 1/0875 (2013.01); B63B 1/048 (2013.01); B63B 21/50 (2013.01); B64C 39/024 (2013.01); B63B 2001/044 (2013.01); B63B 2035/446 (2013.01); B63H 2009/0692 (2013.01); B63J 99/00 (2013.01); Y02E 10/70 (2013.01); Y02E 10/723 (2013.01); Y02E 10/727 (2013.01); Y02T 70/12 (2013.01)

(58) Field of Classification Search
CPC combination set(s) only.
See application file for complete search history.

(56) References Cited

U.S. PATENT DOCUMENTS

| 6,102,758 | A    |         | 8/2000  | Smith                    |
|-----------|------|---------|---------|--------------------------|
| 7,014,416 | B2   |         | 3/2006  | Lund                     |
| 8,053,916 | B2   | *       | 11/2011 | Edwards ....... F03B 13/142 |
|           |      |         |         | 290/44                   |
| 8,439,641 | B2   | *       | 5/2013  | Steinberg ...... F03D 3/067 |
|           |      |         |         | 416/117                  |
| 9,506,451 | B2   |         | 11/2016 | Dehlsen                  |

(Continued)

Primary Examiner — Adam D Tissot
Assistant Examiner — Edward J Pipala
(74) Attorney, Agent, or Firm — McDonnell Boehnen Hulbert & Berghoff LLP

(57) ABSTRACT

The present disclosure relates to systems and methods for rotating a floating platform. An example method includes determining a desired position of a floating platform in a yaw axis. The floating platform is fixed by an anchor leg to an underwater attachment point. The method includes receiving, from a position sensor, information indicative of an actual position of the floating platform in the yaw axis. The method also includes rotating the floating platform in a desired direction about the yaw axis based on the desired position and the actual position. Optionally, the floating platform may include a yaw member and an environmental sensor. In such scenarios, the method may include receiving information about a prevailing wind direction or water current direction. The method may include causing the actuator to adjust the yaw member based on at least one of: the prevailing wind condition or the prevailing water current direction.

34 Claims, 11 Drawing Sheets

Side View

(56) References Cited

U.S. PATENT DOCUMENTS

| | | |
|---|---|---|
| 2010/0003134 A1 | 1/2010 | Edwards et al. |
| 2010/0025996 A1* | 2/2010 | Edwards ................ B63B 39/02 |
| | | 290/44 |
| 2011/0074155 A1 | 3/2011 | Scholte-Wassink |
| 2012/0171034 A1 | 7/2012 | Gabeiras et al. |
| 2013/0236309 A1* | 9/2013 | Rossetti ................ B63B 21/50 |
| | | 416/1 |
| 2014/0322012 A1* | 10/2014 | Steinberg ................ F03D 3/067 |
| | | 416/17 |
| 2016/0318628 A1 | 11/2016 | Vander Lind |
| 2017/0037832 A1* | 2/2017 | Friedrich ............. F03D 7/0224 |

* cited by examiner

Side View

Side View

Top View

Side View

Side View

SYSTEMS AND METHODS FOR YAW CONTROL OF OFFSHORE PLATFORM

BACKGROUND

Power generation systems may convert chemical and/or mechanical energy (e.g., kinetic energy) to electrical energy for various applications, such as utility systems. As one example, a wind energy system may convert kinetic wind energy to electrical energy. In some cases, such wind energy systems may be based from various structures and/or platforms.

SUMMARY

The present disclosure relates to systems and methods for rotating a floating platform that is connected to an underwater anchor point using an anchor leg. Namely, in some scenarios, it may be desirable to rotate the floating platform about a yaw axis. For example, an underwater power cable may become wrapped around the anchor leg. In such scenarios, rotating the floating platform in a desired direction about the yaw axis may at least partially unwrap the underwater power cable from the anchor leg.

In a first aspect, a system is provided. The system includes a floating platform fixed by an anchor leg to an underwater attachment point. The floating platform includes a yaw member and a corresponding actuator. The yaw member is operable to convert aerodynamic force on the yaw member into rotation of the floating platform about a yaw axis. The system also includes a position sensor, an environmental sensor, and a controller. The controller includes a controller and a memory. The controller executes instructions stored in the memory so as to carry out operations. The operations include determining a desired position of the floating platform in the yaw axis and receiving, from the position sensor, information indicative of an actual position of the floating platform in the yaw axis. The operations also include receiving, from the environmental sensor, information indicative of a wind condition and causing the actuator to adjust a position of the yaw member based on the desired position, the actual position, and the wind condition.

In a second aspect, a system is provided. The system includes a floating platform fixed by an anchor leg to an underwater attachment point. The floating platform includes a yaw member and a corresponding actuator. The yaw member is operable to convert hydrodynamic force on the yaw member into rotation of the floating platform about a yaw axis. The system also includes a position sensor, an environmental sensor, and a controller. The controller includes a controller and a memory. The controller executes instructions stored in the memory so as to carry out operations. The operations include determining a desired position of the floating platform in the yaw axis and receiving, from the position sensor, information indicative of an actual position of the floating platform in the yaw axis. The operations include receiving, from the environmental sensor, information indicative of a hydrodynamic condition and causing the actuator to adjust a position of the yaw member based on the desired position, the actual position, and the hydrodynamic condition.

In a third aspect, a system is provided. The system includes a floating platform fixed by an anchor leg to an underwater attachment point, a position sensor, an aerial vehicle; and a controller. The controller includes a controller and a memory. The controller executes instructions stored in the memory so as to carry out operations. The operations include determining a desired position of the floating platform in a yaw axis and receiving, from the position sensor, information indicative of an actual position of the floating platform in the yaw axis. The operations include causing the aerial vehicle to generate thrust so as to rotate the floating platform based on the desired position and the actual position.

In a fourth aspect, a method is provided. The method includes determining a desired position of a floating platform in a yaw axis. The floating platform is fixed by an anchor leg to an underwater attachment point. The method also includes receiving, from a position sensor, information indicative of an actual position of the floating platform in the yaw axis. The method further includes rotating the floating platform in a desired direction about the yaw axis based on the desired position and the actual position.

Other aspects, embodiments, and implementations will become apparent to those of ordinary skill in the art by reading the following detailed description, with reference where appropriate to the accompanying drawings.

DETAILED DESCRIPTION

Figure 1A:
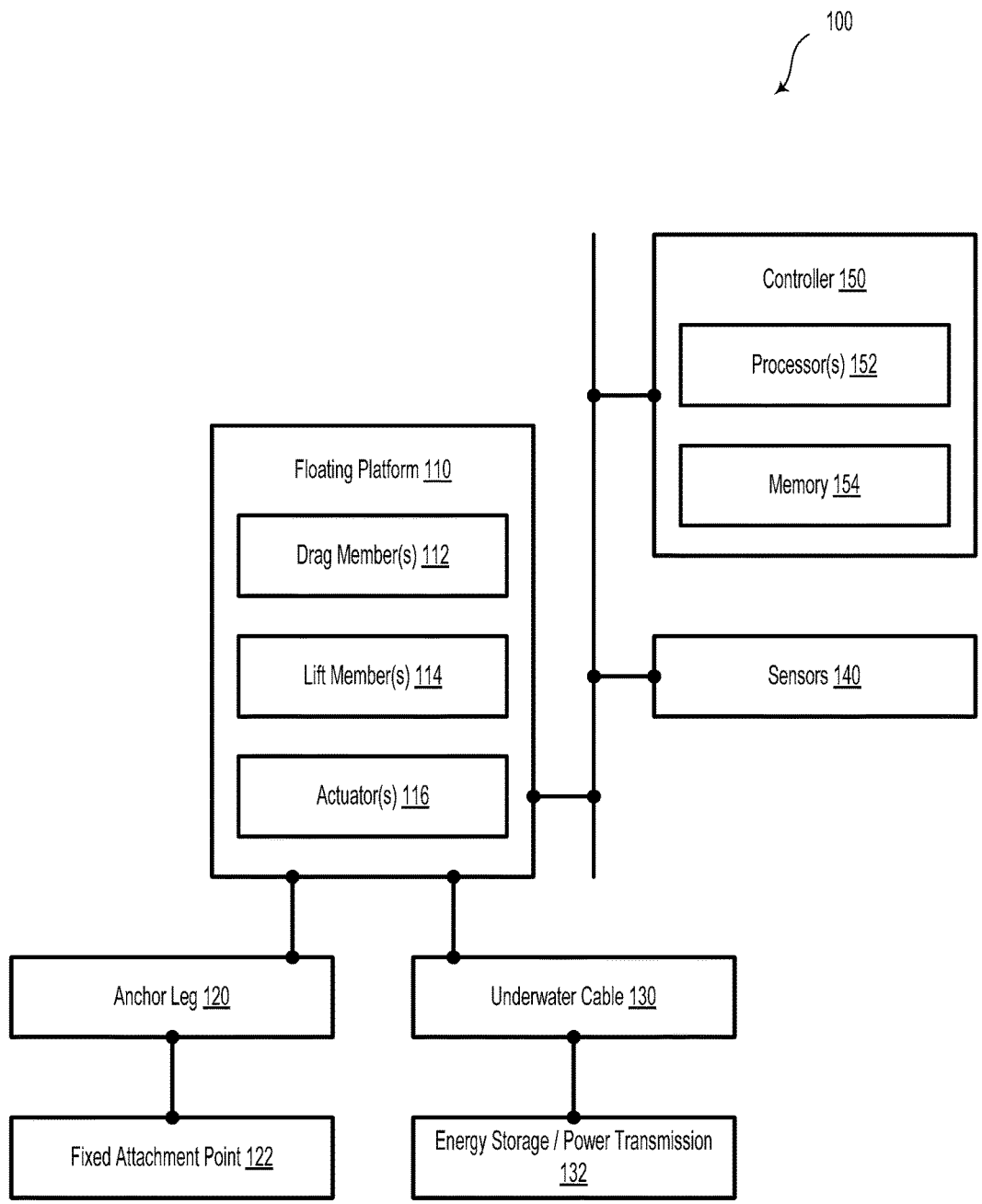
FIG. 1A illustrates a system having a floating platform that includes yaw member(s), such as drag and/or lift member(s), according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Spar buoys or other offshore platforms may support many different water-borne purposes. For instance, spar buoys may be used for navigation, scientific research, or even artificial reefs. As another example, spar buoys may be used as landing and/or tether anchor platforms for offshore wind energy kites. Such spar buoys and offshore platforms will be referred to as floating platforms herein.

In an example embodiment, a floating platform may include a single anchor leg mooring (SALM). The SALM includes a single tension member (e.g., a cable) that couples the floating platform to a fixed underwater anchor position. For example, the tension member may be connected to an underwater anchor, a seafloor attachment point, or ballast, among other possibilities. The SALM may ensure that the floating platform does not substantially drift away from its anchor position, despite prevailing water and wind currents as well as rough seas and storms.

In some embodiments, the floating platform may rotate, or yaw, about the axis of the SALM tension member or anchor leg. In other words, tension leg floating platforms traditionally do not have yaw stiffness or yaw control, which means the floating platform can spin around on its mooring (e.g., its anchor leg).

The yawing movements may be caused by water or wind currents, wave motion, or by activity associated with the floating platform (e.g., any movement that could create a torque about the anchor leg axis). Additionally or alternatively, in the scenario where the floating platform is used to support one or more wind energy kites, sustained or periodic tension applied via a wind energy kite tether(s) may cause the floating platform to yaw.

In some embodiments, it may be undesirable for the floating platform to rotate about a yaw axis of its anchor leg. For example, in the scenario where the floating platform may provide a landing area, undesirable yaw motion could render the landing area unusable for safe landing operations.

Additionally or alternatively, the floating platform may include one or more other underwater cables. As an example, the underwater cables could include an underwater power cable, which could provide an electrical connection with an electrical substation. In such a scenario, energy kite operations may provide power to the electrical substation and possibly to a larger energy grid.

However, due to the yaw motion of the floating platform, the underwater cable could gradually become wrapped around the anchor leg and/or pulled in tension. Over time, the underwater cable and/or the anchor leg may be compromised or otherwise damaged by such physical friction forces and/or tension forces caused by the yaw motion of the floating platform.

Embodiments herein relate to systems and methods to avoid or mitigate undesirable yaw motion of the floating platform and its associated effects. While thrusters, propellers, or other active means of yaw control are possible, embodiments herein relate to systems and methods that are energy-efficient and may take advantage of the wind direction and/or water current direction to achieve the desired effects.

In an example embodiment, a floating platform may include a drag or lift member, such as a fin, a weathervane, a wing, a rudder, or another type of surface that may be positioned with respect to a prevailing wind or water current direction. The drag or lift member may be positioned such that it applies a yaw force on the floating platform. In some cases, the applied yaw force may counteract another yaw force, such as that generated by a tension force of a tether of an energy wind kite. Additionally or alternatively, the applied yaw force may act to "untwist" the floating platform so as to untangle the underwater cable from the anchor leg. Yet further, the applied yaw force may provide improved yaw stability for the floating platform.

In some embodiments, the drag or lift member may be deployed at a specific orientation based on, for example, prevailing wind or water current direction and the desired direction of "untwisting" or yaw force on the floating platform. Furthermore, the floating platform may include several drag or lift members arranged about the floating platform. In such a scenario, specific drag or lift members may be deployed while others may remain stowed, again, based on the prevailing wind or water current direction and desired direction of platform rotation.

In some embodiments, a floating platform with a weather vane-type drag member may align itself at a user-specified orientation within plus or minus about 30 degrees of the wind direction. During various operational modes, it may be desirable to align the spar buoy directly with the wind direction. However, if an off-downwind orientation is desirable, as in the case when landing an energy kite during high-wind-speed conditions, then the drag member could be deployed in an orientation so as to create a yaw equilibrium that orients the floating platform at the desired off-downwind yaw angle.

As an alternative embodiment, in the scenarios where the floating platform supports one or more aerial vehicles, such as wind energy kites, downward thrust from the aerial vehicles (e.g., propeller downwash) could be used to cause a torque or yaw force on the floating platform. For example, the floating platform may include one or more surfaces that could translate propeller downwash into a torque on the floating platform.

In some embodiments, the floating platform could include a first surface over which an aerial vehicle could provide downward thrust to apply a clockwise torque force on the floating platform (as viewed from overhead). Furthermore, the floating platform could include a second surface over which the aerial vehicle could provide downward thrust to apply a counter-clockwise torque on the floating platform. In such scenarios, the aerial vehicle may provide the downward thrust while hovering or while coupled to the perch or another surface of the floating platform.

In some embodiments, the floating platform could include one or more fins that could provide either clockwise or counter-clockwise torque on the floating platform depending on how the fins are rotated with respect to horizontal axes that extend from the floating platform.

In other words, control surfaces coupled to the floating platform could be used to redirect the airflow of an energy kite's propeller downwash in an effort to spin the floating platform, control a yaw angle, and/or potentially unwrap an underwater power cable from an anchor leg of the floating platform.

II. Example Systems

FIG. 1A illustrates a system 100, according to an example embodiment. The system 100 includes a floating platform 110. In an example embodiment, the floating platform 110 may include a spar buoy. In such a scenario, the floating platform 110 may include a tall, thin shape and may float upright in the water. The floating platform 110 may include a small water plane area and a large mass. The floating platform 110 may include other types of floating structures.

The floating platform 110 is coupled to a fixed attachment point 122, which may be located at an underwater location (e.g., a seafloor, a lake bottom, a river bottom, etc.). The fixed attachment point 122 may include an anchor, a fixed seafloor coupling, a swivel, a gimbal, a slip ring, or another type of coupling. The floating platform 110 may be coupled to the fixed attachment point 122 using an anchor leg 120. The anchor leg 120 may include a cable or another type of tension member. In an example embodiment, the anchor leg 120 may include a single anchor leg mooring (SALM).

Additionally or alternatively, the floating platform 110 may be moored by a catenary anchor leg mooring (CALM). Other mooring arrangements are contemplated herein. For example, the floating platform 110 may be coupled to one or more other floating structures by a lateral coupling (e.g., a lateral tether or catenary), which may be disposed above, at, and/or below water level.

The floating platform 110 includes one or more yaw members, which may include an aerodynamic drag member 112 and/or an aerodynamic lift member 114. The aerodynamic lift member 114 may include an airfoil configured to generate a lift force. The yaw members may be fixed or may include corresponding actuators 116. The aerodynamic drag member 112 or aerodynamic lift member 114 may be operable to convert an aerodynamic force into a torque force on the floating platform. Namely, the yaw members may be operable to rotate the floating platform about a yaw axis (e.g., an axis coincident with or parallel to an axis of the anchor leg 120).

The system 100 includes sensors 140, which may include a position sensor and/or an environmental sensor. For example, the position sensor may include a rotation sensor, a global positioning system, an inertial measurement unit, or a compass. In some embodiments, the environmental sensor may include a wind gauge, a weather vane, and/or a pressure sensor.

The system 100 includes a controller 150 having at least one processor 152 and at least one memory 154. The one or more processors 152 may be a general-purpose processor or a special-purpose processor (e.g., digital signal processors, application specific integrated circuits, etc.). The one or more processors 152 may be configured to execute computer-readable program instructions that are stored in the memory 154. As such, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions and perhaps additional data, such as diagnostic data relating to aerial vehicle 170 and/or the floating platform 110. As such, the memory 154 may include program instructions to perform or facilitate some or all of the operations and functionality described herein.

The operations include determining a desired position of the floating platform 110 in the yaw axis.

The operations include receiving, from a position sensor, information indicative of an actual position of the floating platform 110 in the yaw axis.

The operations include receiving, from an environmental sensor, information indicative of a wind condition. In some embodiments, the wind condition may include a wind direction. In some other embodiments, the wind condition may include a wind speed and a wind direction.

The operations include causing an actuator to adjust a position of a yaw member (e.g., drag member 112 and/or lift member 114) based on the desired position, the actual position, and the wind condition.

The operations may optionally include rotating the floating platform 110 in a desired direction about the yaw axis.

In some embodiments, the system 100 may include an underwater cable 130, which may couple the floating platform 110 to an energy storage/power transmission device 132. The underwater cable 130 could be, for example, an umbilical cord that may be configured to provide power, communications, and/or fluids to and/or from the floating platform 110. In an example embodiment, the underwater cable 130 has an axis that is not coaxial with the anchor leg 120. The energy storage/power transmission device 132 can include an electrical storage device such as a battery or a supercapacitor. Additionally or alternatively, the energy storage/power transmission element 132 can include an electrical conductor (a power line), a power grid, a generator, a pump, a power conversion device, or another type of electrical power component.

In such a scenario, the underwater cable 130 may be initially at least partially wrapped around the anchor leg 120. Accordingly, rotating the floating platform 110 in the desired direction about the yaw axis may at least partially unwrap the underwater cable 130 from the anchor leg 120.

In some embodiments, the floating platform 110 may include a plurality of yaw members disposed along an outer surface of the floating platform 110. In such a scenario, the operations may include determining, based on the wind condition, a target yaw member from the plurality of yaw members. Based on the determined target yaw member, the operations may include causing a corresponding actuator to adjust the target yaw member. In other words, the floating platform 110 may include a plurality of extendible drag members 112 along an exterior surface of the floating platform 110. The target drag member may be extended so as to catch the prevailing winds and provide a torque force to rotate the floating platform 110 in a desired direction with respect to the yaw axis.

In other embodiments, the floating platform 110 may additionally or alternatively include one or more yaw members operable to convert a hydrodynamic force into rotation of the floating platform 110 about a yaw axis. In such scenarios, the operations include receiving, from the environmental sensor, information indicative of a hydrodynamic condition. In some embodiments, the hydrodynamic condition may include a water current direction and/or a water current speed.

The operations also include causing the actuator to adjust a position of the yaw member based on the desired position, the actual position, and the hydrodynamic condition. The yaw member may include a hydrodynamic drag member and/or a hydrodynamic lift member. For example, a hydrodynamic lift member may include a hydrofoil configured to provide a hydrodynamic lift force. In such scenarios, the environmental sensor may be configured to provide information regarding a water current speed and/or a water current direction. That is, the environmental sensor may include a pressure sensor. Other ways to determine a water current speed or water current direction are contemplated and possible.

In some embodiments, the operations also include using hydrodynamic forces to rotate the floating platform 110 in a desired direction about the yaw axis.

In an example embodiment, the floating platform 110 may include a plurality of yaw members disposed along an outer surface of the floating platform 110. In such a scenario, the operations may further include determining, based on the hydrodynamic condition, a target yaw member from the plurality of yaw members. The operations may also include causing a corresponding actuator to adjust the target yaw member.

In other words, a plurality of drag and/or lift members (e.g., drag member 112 and/or lift member 114) may be arranged along an outer surface of the floating platform 110. In such a scenario, in response to determining a target yaw member, the controller 150 may cause an actuator to extend, and/or adjust a position of, the target yaw member. In an example embodiment, the extended target yaw member may catch the prevailing water currents so as to rotate the floating platform 110 about the yaw axis.

Figure 1B:
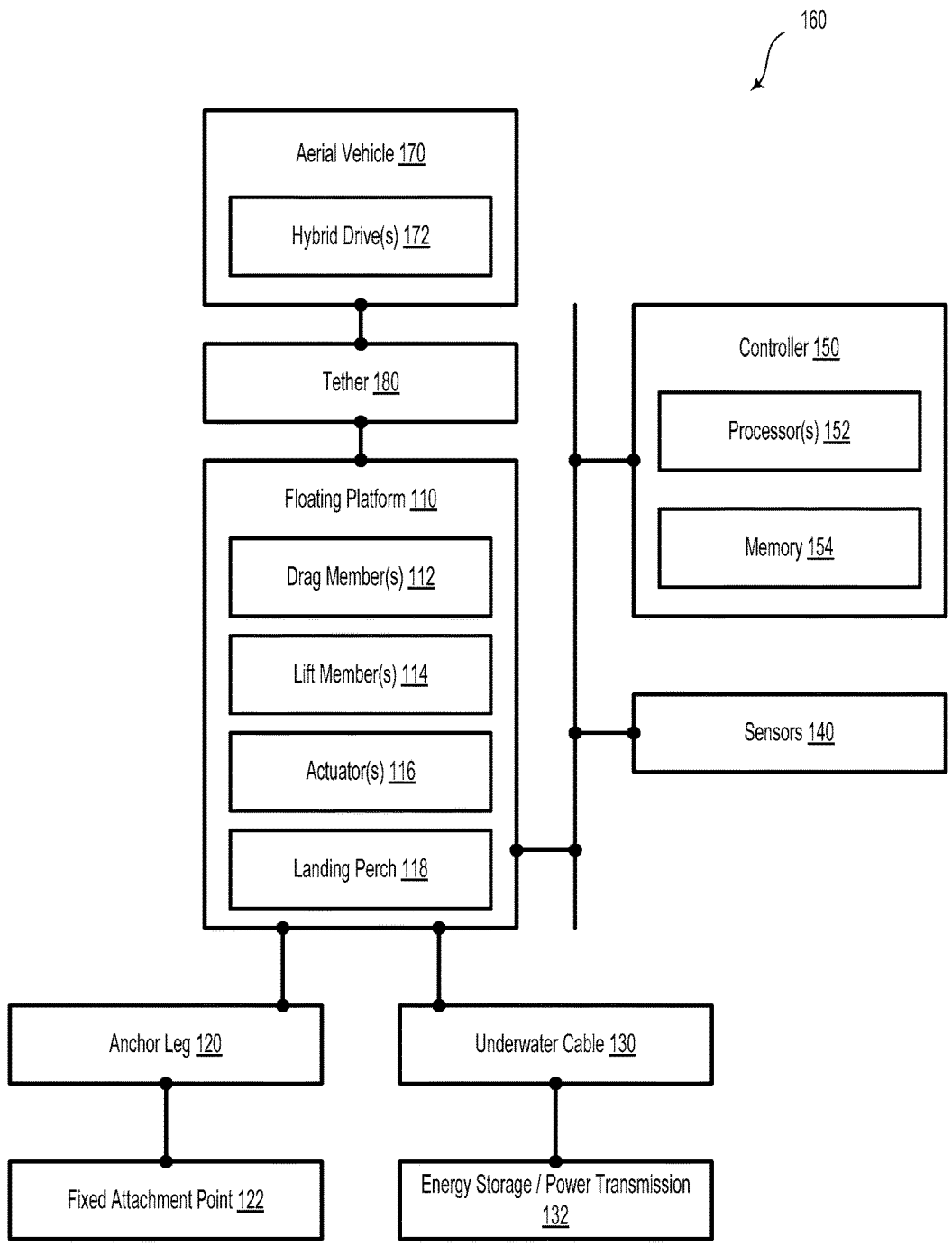
FIG. 1B illustrates a system having an aerial vehicle as well as a floating platform that includes yaw member(s), such as drag and/or lift member(s), according to an example embodiment.

FIG. 1B illustrates a system 160, according to an example embodiment. In particular, system 160 may include some or all of the elements of system 100 as illustrated and described with regard to FIG. 1. For instance, system 160 may include a floating platform 110. As described herein, the floating platform 110 may be fixed by an anchor leg 120 to an underwater attachment point 122. In some embodiments, the floating platform 110 may additionally be coupled to an energy storage/power transmission device 132 using an underwater cable 130.

System 160 may include various sensors 140. For example, sensors 140 may include a position sensor. In such scenarios, the position sensor may include a rotation sensor, a global positioning system, an inertial measurement unit, or a compass.

System 160 also includes an aerial vehicle 170. The aerial vehicle 170 may include or take the form of various types of devices, such as a kite, a helicopter, a wing and/or an airplane, among other possibilities. The aerial vehicle 170 may be formed of structures including metal, plastic and/or other polymers. The aerial vehicle 170 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

In some embodiments, the aerial vehicle 170 may be coupled to the floating platform 110 using a tether 180. In an example embodiment, the tether 180 may include two or more bridle segments, which may be coupled to various bridle attachment points on the aerial vehicle 170. As an example, the tether 180 may include a core configured to withstand one or more forces of the aerial vehicle 170 when the aerial vehicle 170 is in hover flight, forward flight, and/or crosswind flight modes. The core may be constructed of any high strength fibers (e.g., carbon fiber, carbon nanotubes, polymer fibers, or another type of structural fiber). In some examples, the tether 180 may have a fixed length and/or a variable length. For instance, in at least one such example, the tether 180 may have a length of 140 meters. Other lengths of tether 180 are possible and contemplated.

In scenarios such as those illustrated in FIG. 1B, the underwater cable 130 need not be coaxial with the anchor leg 120 or the tether 180.

In an example embodiment, the aerial vehicle 170 may include at least one hybrid drive 172 (e.g., an electric motor) configured to generate electricity while the aerial vehicle is operating in a crosswind flight mode. That is, the aerial vehicle 170 may be operable to convert wind energy to electrical energy in an electrical energy generation operating mode. In other modes of operation, the hybrid drive(s) 172 may generate thrust. For example, the hybrid drive(s) 172 may provide thrust during takeoff, hover, and perched modes of operation.

The tether 180 may provide a conduit for transmitting electricity to the aerial vehicle 170 in order to power the aerial vehicle 170 for takeoff, landing, hover flight, and/or forward flight. The tether 180 may be constructed in any form and using any material which may allow for the transmission, delivery, and/or harnessing of electrical energy generated by the aerial vehicle 170 and/or transmission of electricity to the aerial vehicle 170. The tether 180 may also be configured to withstand one or more forces of the aerial vehicle 170 when the aerial vehicle 170 is in an operational mode.

The tether 180 may also provide a conduit for transmitting electrical energy generated by the aerial vehicle 170. For example, the tether 180 may be configured to conduct electrical energy to floating platform 110 and/or to energy storage/power transmission device 132 (e.g., using underwater cable 130). That is, in an example embodiment, the tether 180 may provide electrical coupling between the aerial vehicle 170 and an electrical storage device.

Additionally or alternatively, the aerial vehicle 170 may be operable to convert wind energy into a mechanical tension in the tether 180. For example, the aerial vehicle 170 may include a mechanical "pump kite." In such a scenario, the aerial vehicle 170 may be operable to fly along various flight paths, including a figure-eight. Furthermore, the tether 180 may be coupled to a device operable to convert the mechanical energy in the tether 180 to electrical energy. For example, the tether 180 may be directly or indirectly coupled to a shaft of an electrical generator.

In example embodiments, the floating platform 110 may include a landing perch 118. The landing perch 118 may be configured to act as a landing location for the aerial vehicle 170. In other words, the aerial vehicle 170 may be configured to land on, or couple to, the landing perch 118. The landing perch 118 may be formed of any material that can suitably keep the aerial vehicle 170 attached and/or anchored to the floating platform 110.

The landing perch 118 may be used to hold and/or support the aerial vehicle 170 until it is in an operational flight mode. That is, the landing perch 118 may receive the aerial vehicle 170 during a landing operation. In an example embodiment, the landing perch 118 may provide a safe landing location for the aerial vehicle 170 in the event of a storm or other conditions that are not suitable for flight operations. For example, if a wind speed (e.g., measured by a weather station on the floating platform 110) exceeds a threshold wind speed (e.g., 90 kilometers per hour), the controller 150 may cause the aerial vehicle 170 to land at the landing perch 118 to reduce the risk of damage to the aerial vehicle 170 or other parts of the system 160 (e.g., the tether 180 and/or the floating platform 110).

In some embodiments, after receiving an aerial vehicle 170, the landing perch 118 may also be configured to allow for the repositioning of the aerial vehicle 170 such that redeployment of the aerial vehicle 170 is possible. That is, aerial vehicle 110 may be configured to perform takeoff operations from, and landing operations to, the landing perch 118. For instance, the landing perch 118 may receive the aerial vehicle 170 for landing in a first orientation and adjust the aerial vehicle 170 to a second orientation for takeoff/launch operations.

In an example embodiment, repositioning of the aerial vehicle 170 on the landing perch 118 may include rotating the aerial vehicle 170 about an axis perpendicular to the yaw axis. For example, the landing perch 118 may be configured to tilt or rotate the aerial vehicle 170 a vertical orientation into a horizontal orientation. Other ways to reposition the aerial vehicle 170 are possible and contemplated herein.

System 160 also includes a controller 150. The controller 150 includes a processor 152 and a memory 154. As described herein, the controller 150 may carry out certain operations.

The operations include determining a desired position of the floating platform 110 in a yaw axis.

The operations also include receiving, from a position sensor, information indicative of an actual position of the floating platform 110 in the yaw axis.

The operations additionally include causing the aerial vehicle 170 to generate thrust so as to rotate the floating platform 110 based on the desired position and the actual position.

In an example embodiment, the floating platform 110 may include a yaw member (e.g., drag member 112 and/or lift member 114). The yaw member is operable to convert a downward thrust force on the yaw member into rotation of the floating platform 110 about the yaw axis. That is, the aerial vehicle 170 may generate thrust onto the yaw member while hovering over the floating platform 110 or while coupled to a landing perch 118. The yaw member may redirect the downward thrust (e.g., so the redirected thrust vector has a non-zero horizontal component) so as to rotate the floating platform 110 about the yaw axis.

Additionally or alternatively, the aerial vehicle 170 may provide thrust while coupled to a landing perch 118 on the floating platform 110. In such a scenario, the thrust provided by the aerial vehicle 170 may directly exert a torque force on the floating platform 110 so as to rotate it in a desired direction about the yaw axis. For example, the landing perch 118 may rotate or tilt the aerial vehicle 170 so that a thrust vector of the thrust generated by the aerial vehicle 170 comprises a non-zero horizontal component.

In other words, while aerial vehicle 170 is perched on its landing perch 118 or cradle, the landing perch 118 may tip sideways or rotate the aerial vehicle 170 so a thrust vector of thrust generated from the aerial vehicle 170 includes a non-zero horizontal component with respect to a surface of the body of water in which the floating platform 110 is floating.

As described herein, rotating the floating platform 110 in the desired direction about the yaw axis may at least partially unwrap an underwater cable 130 from the anchor leg 120.

Two or more elements of system 100 and/or system 160 may be communicatively coupled using a communication interface. The communication interface may include one or more wireless interfaces and/or one or more wired interfaces. As an example, such a communication interface may provide a communication link between the floating platform 110 and the aerial vehicle 170 using one or more networks. As described herein, wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Wired interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The floating platform 110 may communicate with the aerial vehicle 170, other floating platforms, and/or other entities (e.g., a command center) using the communication system.

Figure 2A:
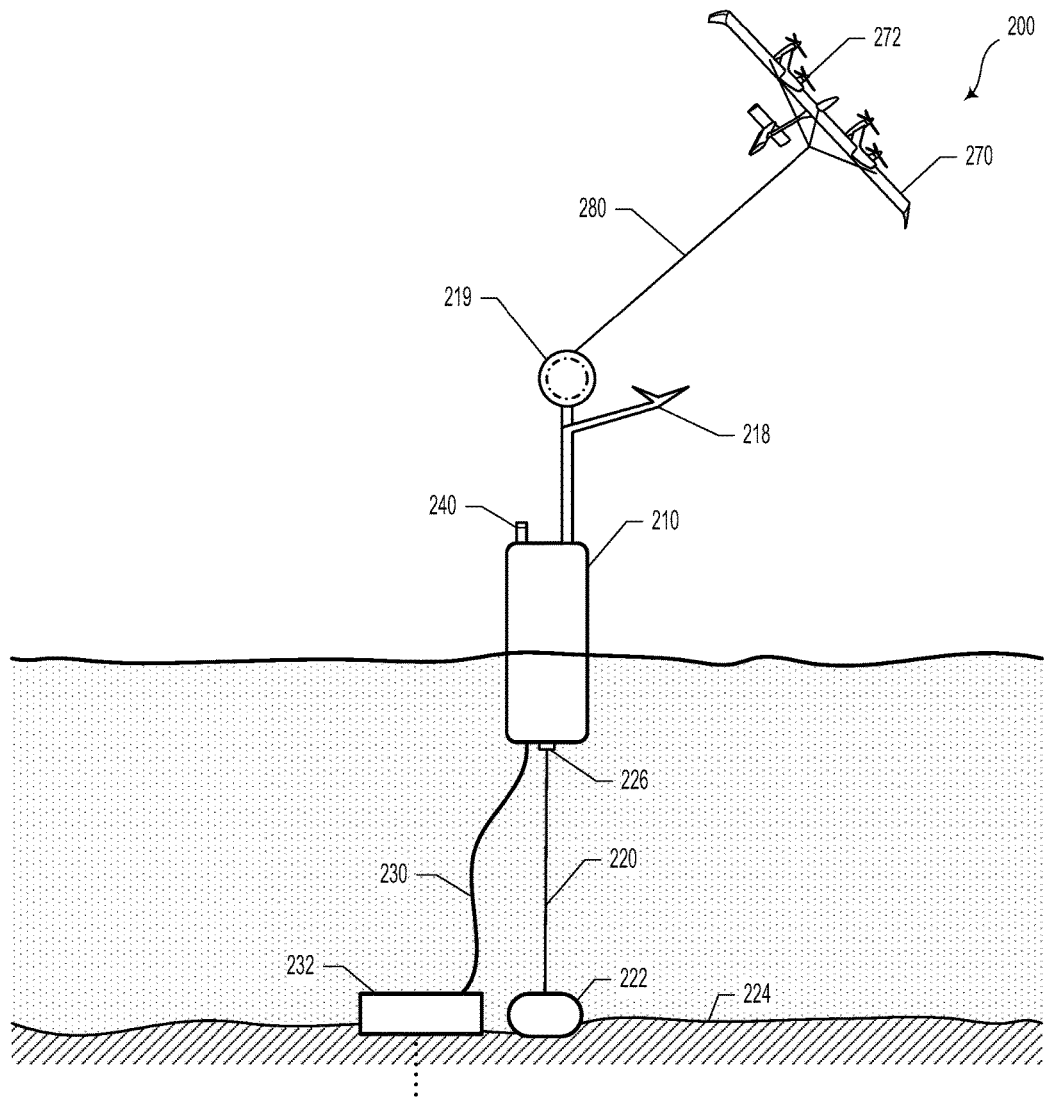
FIG. 2A illustrates an aerial vehicle coupled to a floating platform, according to an example embodiment.

FIG. 2A illustrates a side view of system 200, according to an example embodiment. System 200 may include at least some of the elements of system 100 and system 160 as illustrated and described in relation to FIGS. 1A and 1B, respectively. For example, system 200 includes a floating platform 210. The floating platform 210 may be connected to a fixed attachment point 222 using an anchor leg 220. In example embodiments, the fixed attachment point 222 may be located at, or proximate to, a seafloor location 224 (e.g., a sea bottom, a lake bottom, a river bottom, etc.).

In example embodiments, the floating platform 210 may be connected to an energy storage/power transmission device 232 using an underwater cable 230.

System 200 also includes an aerial vehicle 270. The aerial vehicle 270 may include one or more hybrid drives 272 that may be operable to generate electrical energy and/or thrust for the aerial vehicle 210. The aerial vehicle 270 may be configured to fly substantially along a flight path to generate electrical energy. The flight path may include a substantially circular shape or another curved shape. For example, flight path may include an oval-shaped flight pattern oriented substantially perpendicular to a prevailing wind direction. In at least one such example, the flight path may have a radius of up to 265 meters. However, other flight path orientations are possible and contemplated herein. Other flight path shapes may include an oval (e.g., an ellipse), the shape of the numeral 8 ("a figure-eight"), etc. The term "substantially along," as used in this disclosure, refers to exactly along and/or one or more deviations from exactly along that do not significantly impact generation of electrical energy as described herein.

The aerial vehicle 270 may be coupled to the floating platform 210 using a tether 280. A working length of tether 280 may be adjusted by a tether reel 219 or another type of winding mechanism. The tether reel 219, which may be attached to the floating platform 210, can provide a controllable length for the tether 280. In other embodiments, tether 280 may have a fixed length.

The floating platform 210 may include a landing perch 218 configured to provide a landing location for the aerial vehicle 270. The landing perch 218 may include a fixed arm, a moveable arm, a net, a peg, or another type of structure configured to receive an aerial vehicle 270 during landing operations and support the aerial vehicle 270 during non-flight operations.

In some embodiments, the aerial vehicle 270 can include landing gear or another type of structure suitable for stabilizing and/or anchoring the aerial vehicle 270 to a surface or structure during non-flight operations. For example, the landing gear may include a gripper and/or jaw mechanism configured to couple to the landing perch 218. In another example embodiment, the landing gear may include tires, legs, and/or skids. In such scenarios, the aerial vehicle 270 may be configured to land on a landing surface of the floating platform 210. In yet other examples, the aerial vehicle 270 can be configured to land onto or into water.

As illustrated, the floating platform 210 may be configured to receive one aerial vehicle 270 during non-flight operations. However, it is understood that floating platform 210 may have a landing capacity of greater than one aerial vehicle 270. For instance, floating platform 210 may be configured to receive two or more aerial vehicles 270.

The system 200 includes various sensors. For example, in some embodiments, a rotation sensor 226 may provide information indicative of a position of the floating platform 210. Additionally or alternatively, the floating platform 210 may include an environmental sensor 240. Environmental sensor 240 may provide information indicative of a wind velocity and/or wind direction. While illustrated as being attached to the floating platform 210, environmental sensor 240 could be located at another location. Furthermore, the information indicative of the wind velocity and/or wind direction may be provided by an environmental sensor 240 that is located remotely from the floating platform 210.

Figure 2B:
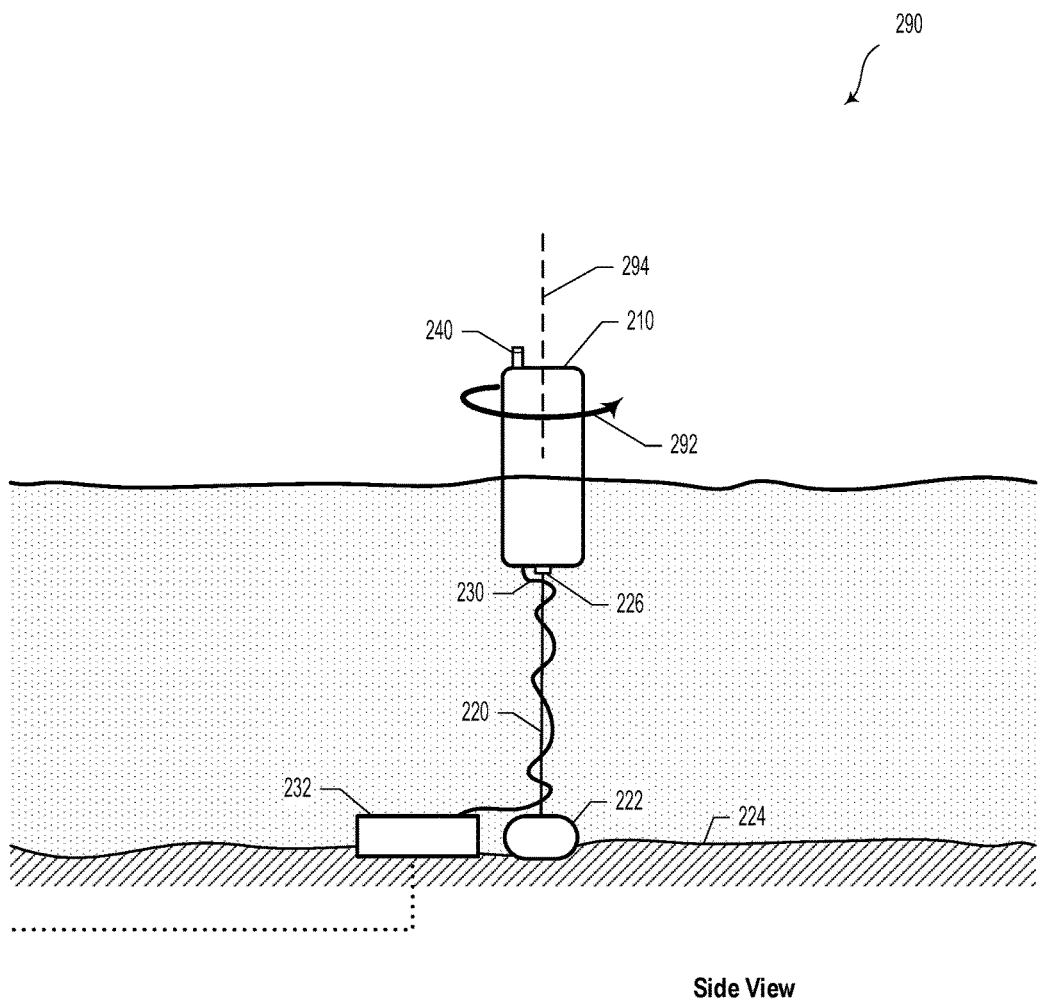
FIG. 2B illustrates an underwater cable becoming tangled with and/or wrapped around an anchor leg due to rotation of a floating platform about a yaw axis, according to an example embodiment.

FIG. 2B illustrates a system 290, according to an example embodiment. System 290 may be similar or identical to systems 100, 160, and 200 as illustrated and described in reference to FIGS. 1A, 1B, and 2A. In some embodiments, due to wind and/or wave motion, floating platform 210 may rotate about a yaw axis 294 (e.g., as illustrated with rotational motion 292). In some cases, the yaw axis 294 may be coincident and/or parallel with an axis of the anchor leg 220.

Due at least in part to the rotation of the floating platform 290 about the yaw axis 294, the underwater cable 230 may become tangled with and/or wrapped around the anchor leg 220. Example methods and systems described herein may provide a way to unwrap and/or untangle the underwater cable 230 from the anchor leg 220. Additionally or alternatively, methods and systems described herein may provide a way to adjust a rotational position of the floating platform 210 with respect to the yaw axis 294.

Figure 3A:
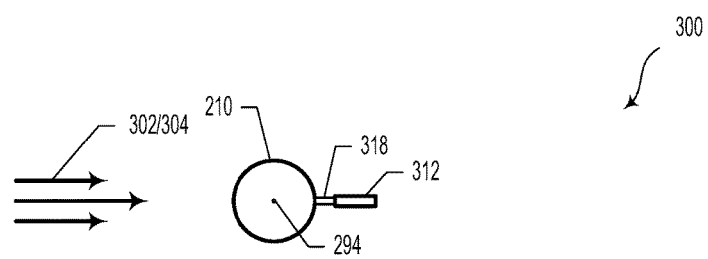
FIG. 3A illustrates a top view and a side view of a floating platform including drag member(s), according to an example embodiment.
Figure 3A:
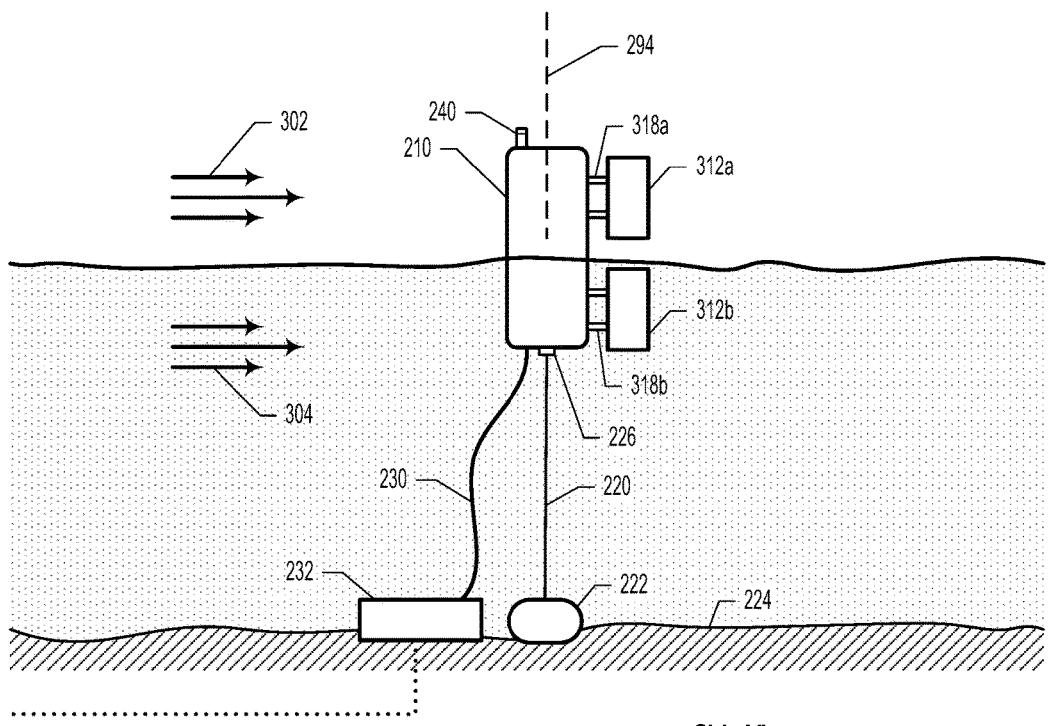

FIG. 3A illustrates top and side views of a system 300, according to an example embodiment. System 300 may be similar or identical to systems 100, 160, 200, and 290 as illustrated and described in reference to FIGS. 1A, 1B, 2A, and 2B.

System 300 includes a floating platform 210 that includes at least one drag member 312. As illustrated in the side view, the drag member 312 may include an aerodynamic drag member 312a and/or a hydrodynamic drag member 312b. In an example embodiment, the aerodynamic drag member 312a may interact with the prevailing winds 302 so as to rotate the floating platform 210 to an aerodynamically-stable position about the yaw axis 294 (e.g., with aerodynamic drag member 312a oriented downwind from prevailing winds 302). Similarly, the hydrodynamic drag member 312b may interact with the prevailing water currents/waves 304 so as to rotate the floating platform 210 to a hydrodynamically-stable position about the yaw axis 294 (e.g., with hydrodynamic drag member 312b oriented downstream from prevailing water currents/waves 304).

The drag member(s) 312 could be coupled to the floating platform 210 using one or more corresponding actuator(s) 318 (e.g., actuators 318a and 318b). As an example, the actuator(s) 318 may include a mechanism or system configured to apply mechanical force to the drag member(s) 312 using electrical energy, hydraulic fluid pressure, and/or pneumatic pressure. For instance, the actuator(s) 318 may extend a corresponding drag member 312 outward from a surface of the floating platform 210 so as to catch prevailing winds 302 and/or prevailing water currents 304.

Figure 3B:
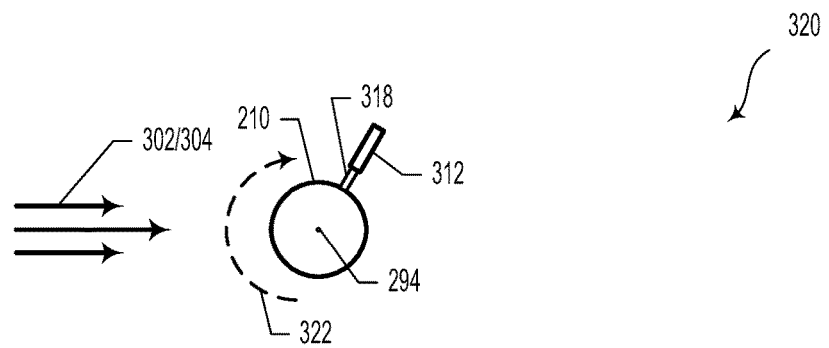
FIG. 3B illustrates various scenarios of a floating platform rotating due to a drag member, according to example embodiments.
Figure 3B:
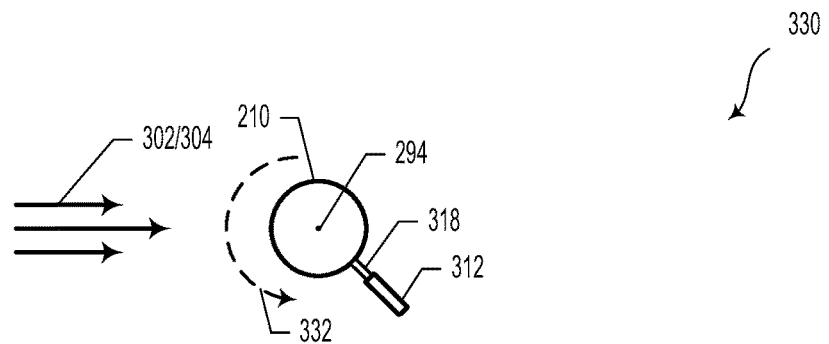
Figure 3B:
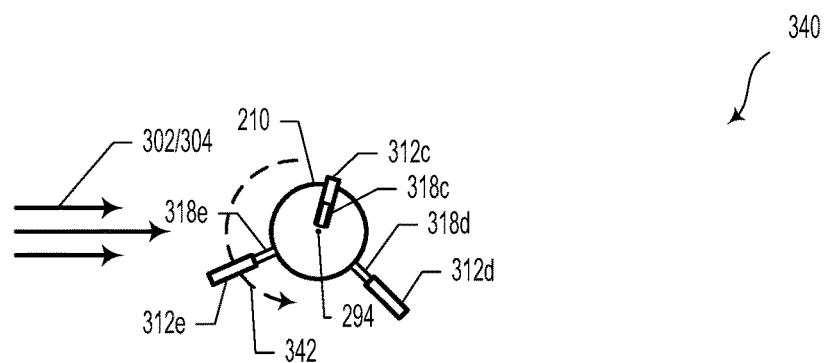

FIG. 3B illustrates various scenarios 320, 330, and 340, according to example embodiments. Scenarios 320, 330, and/or 340 may involve elements of systems 100, 160, 200, 290, and 300 as illustrated and described in reference to FIGS. 1A, 1B, 2A, 2B, and 3A.

Scenario 320 includes a floating platform 210 with a drag member 312 as viewed from above. In the illustrated scenario 320, drag member 312 may catch prevailing winds 302 and/or prevailing water currents 304 so as to rotate the floating platform 210 in a clockwise direction 322 with respect to the yaw axis 294.

Scenario 330 includes a floating platform 210 with a drag member 312 as viewed from above. In the illustrated scenario 330, drag member 312 may catch prevailing winds 302 and/or prevailing water currents 304 so as to rotate the floating platform 210 in a counter-clockwise direction 332 with respect to the yaw axis 294.

Scenario 340 includes a floating platform 210 with a plurality of drag members 312c, 312d, and 312e. In such a scenario, two of the drag members 312e and 312d may be extended using corresponding actuators 318e and 318d. As illustrated in scenario 340, drag members 312e and 312d may catch prevailing winds 302 and/or prevailing current 304 so as to rotate the floating platform 210 in a counter-clockwise direction 342 with respect to the yaw axis 294.

In example embodiments similar to those illustrated in scenario 340, the drag members may be extended and retracted in a manner so as to continuously rotate the floating platform 210 in a desired direction with respect to the yaw axis 294. That is, once a given extended drag member reaches a downstream or downwind position, it may be retracted. Furthermore, a retracted drag member may be extended where it may catch prevailing winds 302 or prevailing water currents 304 so as to rotate the floating platform 210 in the desired direction. It will be understood that a variety of extension and retraction patterns (sequential or otherwise) may be used to rotate the floating platform 210 in the desired direction.

Figure 3C:
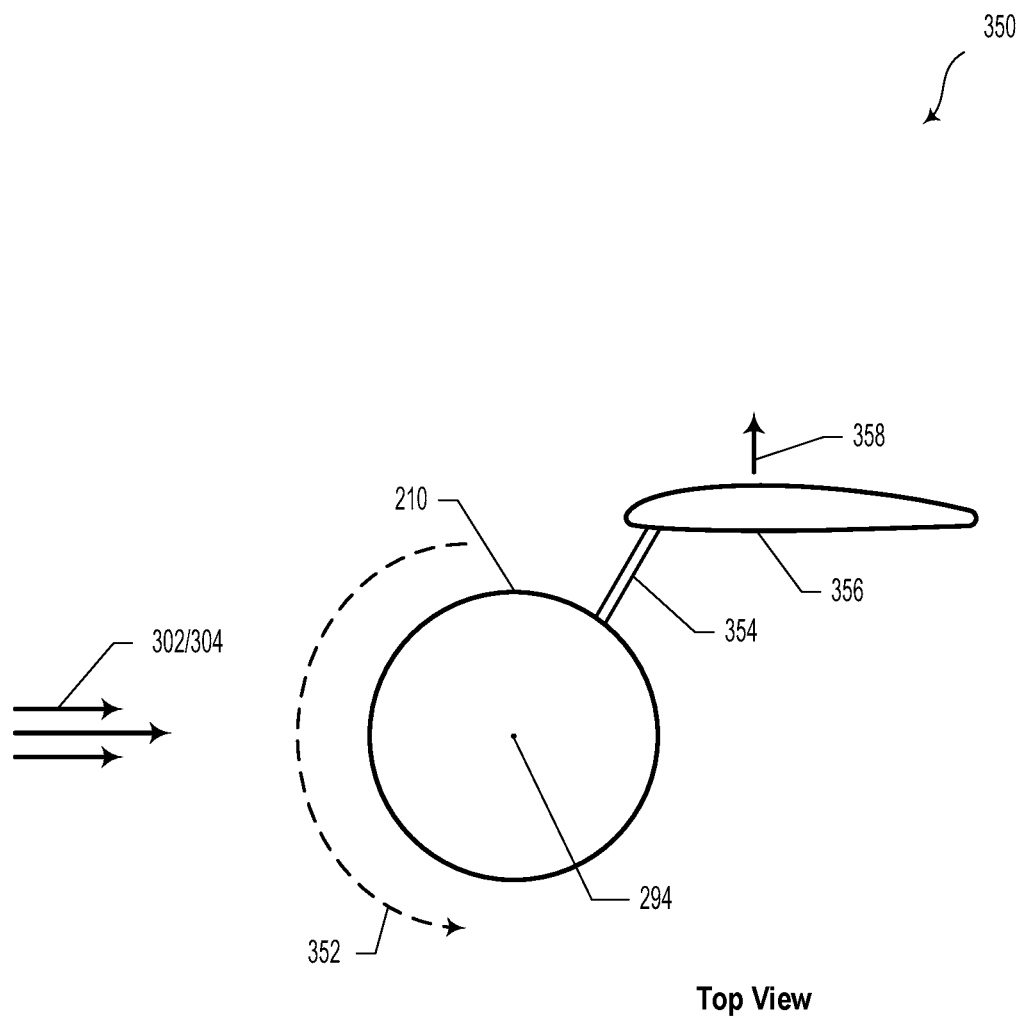
FIG. 3C illustrates a top view of a floating platform including a lift member, according to an example embodiment.

FIG. 3C illustrates a top view of system 350, according to an example embodiment. System 350 may be similar or identical to systems 100, 160, 200, 290, and 300 as illustrated and described in reference to FIGS. 1A, 1B, 2A, 2B, and 3A.

System 350 includes a lift member 356 and a corresponding actuator 354. The lift member 356 may be shaped so as to provide an aerodynamic or hydrodynamic lift force 358 with respect to a prevailing wind 302 and/or prevailing water current 304. The lift force 358 may include a force that is perpendicular to the prevailing wind 302 and/or the prevailing water current 304. In the illustrated scenario, the lift force 358 may include a torque force that causes the floating platform 210 to rotate in a counter-clockwise direction with respect to the yaw axis 294.

In some cases, the lift member 356 may include a sail or a structure with a cross-section similar to a typical wing of an aircraft. The lift member 356 may be flexible, semi-rigid, or rigid. In general, the lift member 356 may be shaped and/or otherwise configured to provide a pressure gradient perpendicular to the prevailing flow of water or air. Such a pressure gradient may be utilized to provide a torque force to rotate the floating platform 210 in the desired direction.

It will be understood that the lift member 356 may be adjusted (e.g., with the actuator 354) so as to change an angle of attack, a shape, and/or a position with respect to the prevailing wind 302 or prevailing water current 304. Such adjustments of the lift member 356 may increase or decrease the lift force provided, which in turn may change the torque force and/or the rotational speed or direction of the floating platform 210. Furthermore, while a single lift member 356 is illustrated in FIG. 3C, it will be understood that a plurality of lift members are contemplated within the scope of the present disclosure.

Figure 4A:
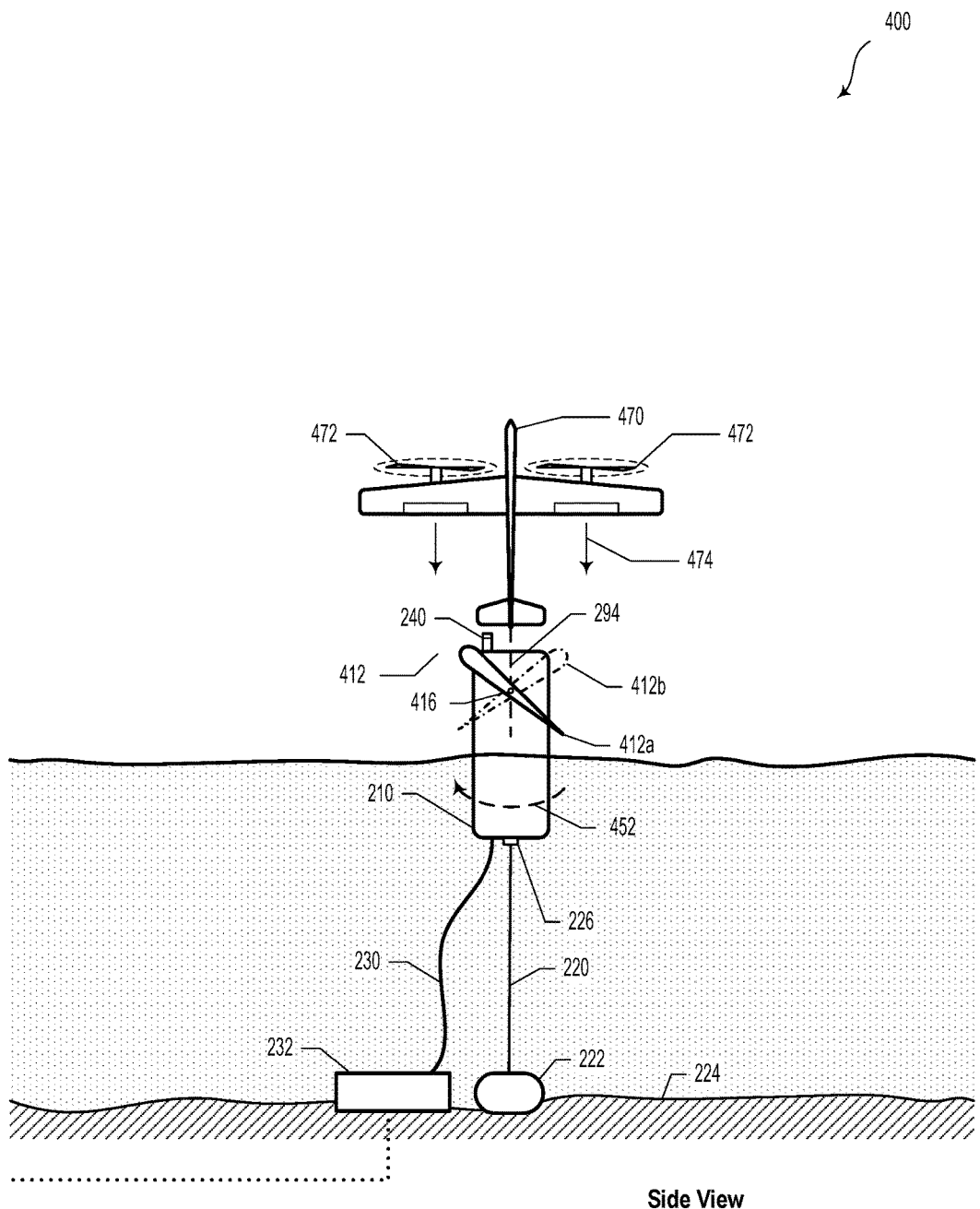
FIG. 4A illustrates a hovering aerial vehicle generating thrust towards a yaw member of a floating platform, according to an example embodiment.

FIG. 4A illustrates a side view of system 400, according to an example embodiment. System 400 may be similar or identical to systems 100, 160, 200, 290, 300, and 350 as illustrated and described in reference to FIGS. 1A, 1B, 2A, 2B, 3A, and 3C. Namely, system 400 includes an aerial vehicle 470 with hybrid drives 472 configured to provide thrust 474. As illustrated, the aerial vehicle 470 may be hovering above floating platform 210. Thrust 474 generated by the aerial vehicle 470 may be directed downward toward a yaw member 412. The yaw member may be configured to at least partially redirect the thrust 474 so as to provide a torque force on the floating platform 210 about the yaw axis 294. In other words, the downward thrust 474 may be redirected by yaw member 412 so as to provide thrust with a horizontal component. In such a scenario, the floating platform 210 may rotate in a clockwise direction when viewed from above and with respect to the yaw axis 294.

Additionally or alternatively, yaw member 412 may be adjustable between various orientations (e.g., orientation 412a and orientation 412b). For example, an actuator 416 may be configured to rotate the yaw member 412 about an axis perpendicular to the yaw axis 294. In such a scenario, the thrust 474 may be redirected in various directions and may thus provide varying degrees of torque force and torque direction on the floating platform 210 with respect to the yaw axis 294. Accordingly, by adjusting an orientation of the yaw member 412 and providing downward thrust 474 on it, the floating platform 210 may be controllably rotated (e.g., in a desired direction and at a desired rate).

While FIG. 4A illustrates an adjustable yaw member 412, it will be understood that fixed yaw members are also contemplated herein. For example, fixed yaw members may include one or more angled surfaces along a top side of the floating platform 210. That is, an aerial vehicle 470 may direct its thrust 474 toward one or more inclined planes along a top side of the floating platform so as to generate a torque force on the floating platform 210 and rotate it in a desired direction and at a desired rotation rate.

Figure 4B:
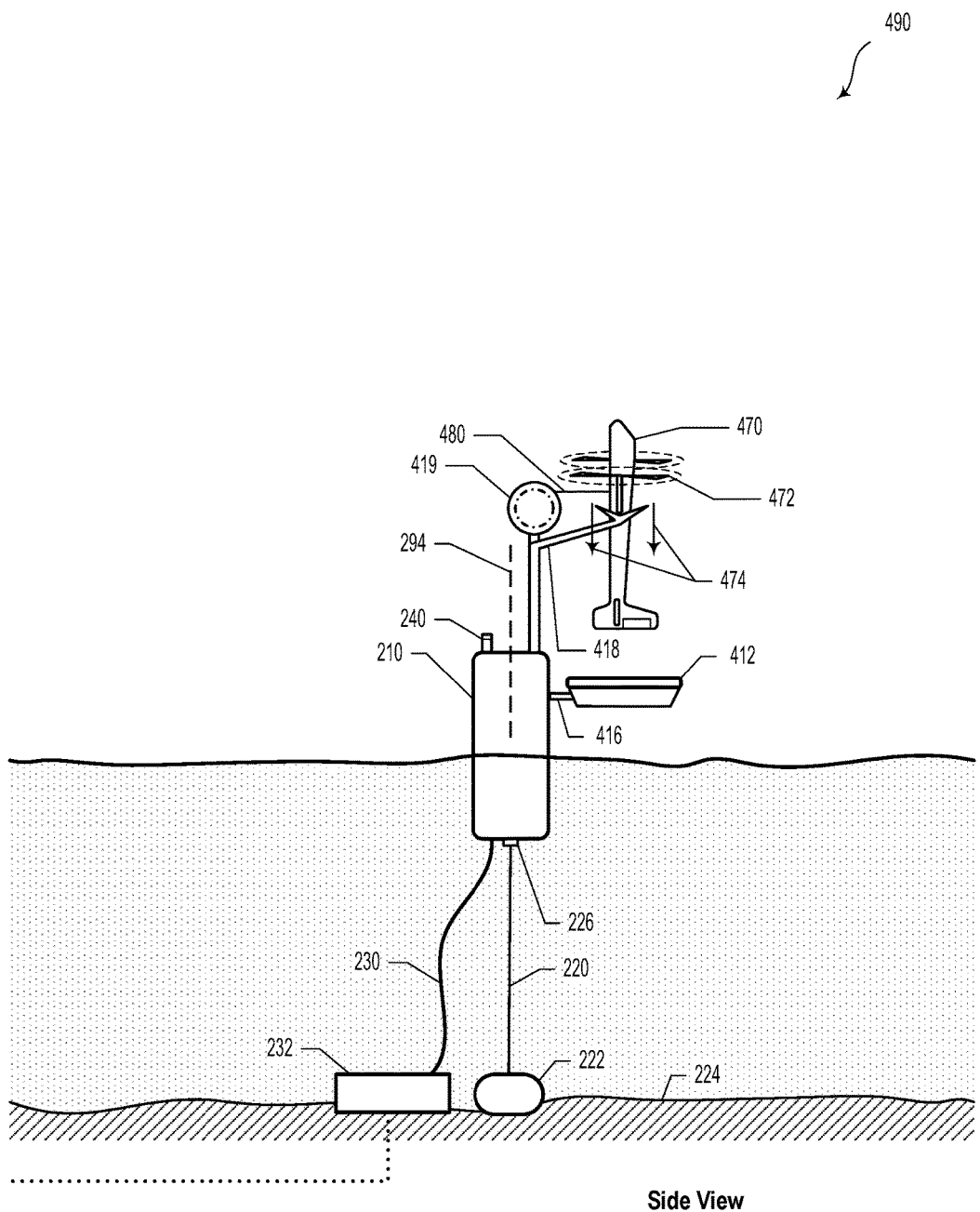
FIG. 4B illustrates an aerial vehicle on a landing perch generating thrust towards a yaw member of a floating platform, according to an example embodiment.

FIG. 4B illustrates a side view of system 490, according to an example embodiment. System 490 may be similar or identical to systems 100, 160, 200, 290, 300, 350, and/or 400 as illustrated and described in reference to FIGS. 1A, 1B, 2A, 2B, 3A, 3C, and 4A.

System 490 includes an aerial vehicle 470 with hybrid drives 472 that provide thrust 474. System 490 also includes a landing perch 418, a tether 480, and a tether reel 419.

As illustrated in FIG. 4B, aerial vehicle 470 may be coupled to the landing perch 418. That is, aerial vehicle 470 may be fixed or supported by the landing perch 418 in a non-flight mode of operation. In such a scenario, the hybrid drives 472 may provide thrust 474 may be directed toward a yaw member 412. Yaw member 412 may be configured to redirect the thrust 474 along a thrust vector having a non-zero horizontal component. In such a manner, system 490 may provide a way to rotate the floating platform 210 about the yaw axis 294 while the aerial vehicle 470 is perched on the landing perch 418 and while the aerial vehicle 470 is in a non-flight mode of operation.

Figure 4C:
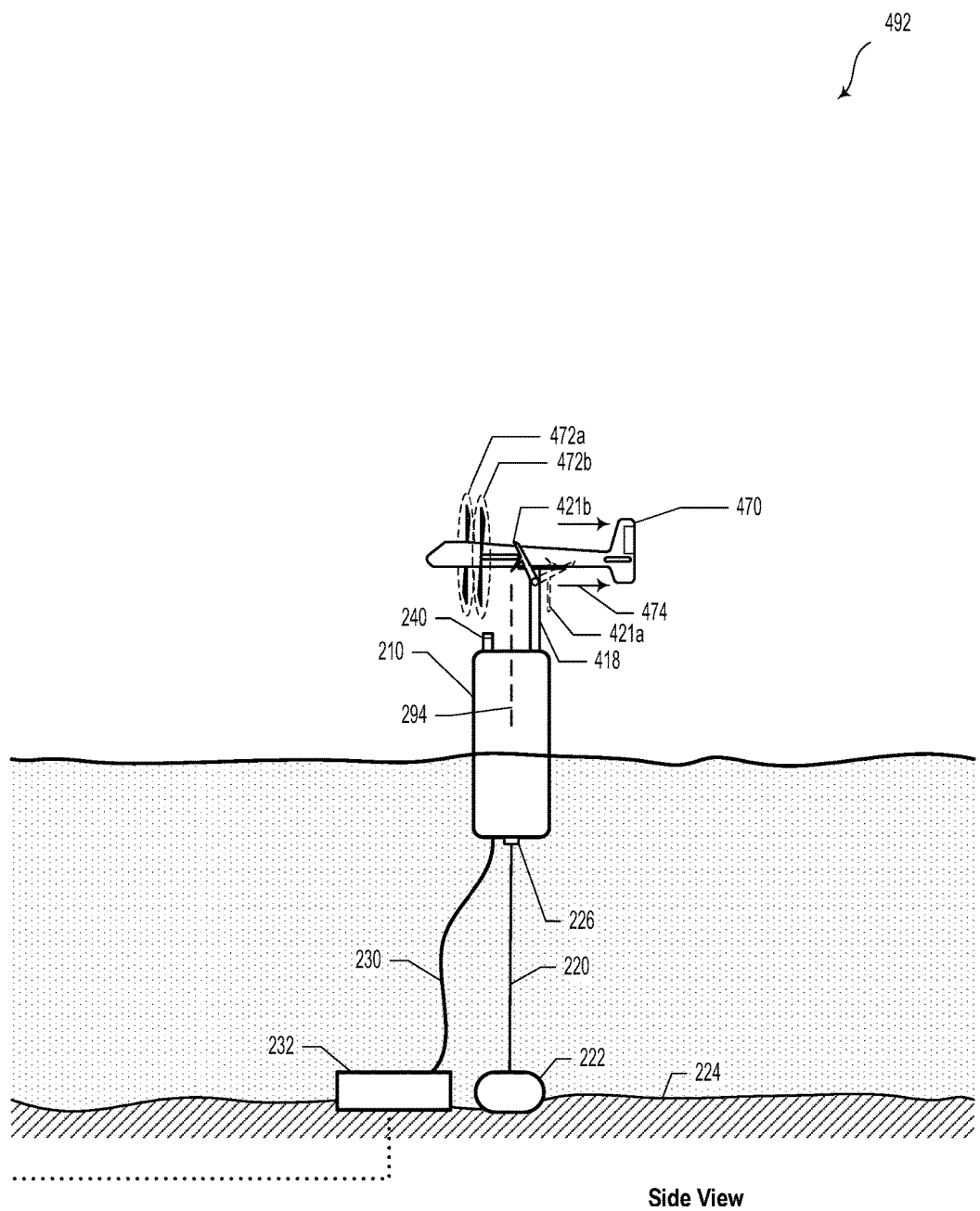
FIG. 4C illustrates an aerial vehicle on a landing perch generating thrust having a thrust vector with a non-zero horizontal component, according to an example embodiment.

FIG. 4C illustrates a side view of system 492, according to an example embodiment. System 492 may be similar or identical to systems 100, 160, 200, 290, 300, 350, 400 and/or 490 as illustrated and described in reference to FIGS. 1A, 1B, 2A, 2B, 3A, 3C, 4A and 4B.

Namely, system 492 may include an aerial vehicle 470 coupled to a landing perch 418. In example embodiments, the landing perch 418 may include an adjustable support. The adjustable support may be controllably adjusted between at least two positions. For example, a first position 421a of the adjustable support may provide support for the aerial vehicle 470 so that the aerial vehicle 470 is oriented in a vertical orientation. Furthermore, a second position 421b of the adjustable support may provide support for the aerial vehicle 470 so that the aerial vehicle is oriented in a horizontal orientation. Other orientations are contemplated. In an example embodiment, the adjustable support may be configured to orient the aerial vehicle 470 at a 45 degree angle or another angle between a horizontal orientation and a vertical orientation.

As illustrated in FIG. 4C, the landing perch 418 and the adjustable support may provide a way for the aerial vehicle 470 to provide thrust 474 having a thrust vector with a non-zero horizontal component. As such, the thrust 474 may directly provide a torque force on the floating platform 210 so as to rotate it in a controllable manner.

Additionally or alternatively, the hybrid drives (e.g., 472a and 472b) may be selectively controlled so as to adjust the amount and direction of thrust 474 and the resulting torque force on the floating platform 210. For example, a particular hybrid drive (e.g., 472a or 472b) may be selected to provide thrust so as to rotate the floating platform 210 in a desired direction with respect to the yaw axis 294. Additionally or alternatively, the hybrid drives (e.g., 472a or 472b) may controllably operate simultaneously with either "forward" or "reverse" thrust so as to provide the appropriate torque force on the floating platform 210. That is, hybrid drive 472a may provide thrust in a "forward" direction while hybrid drive 472b provides thrust in a "reverse" direction so as to provide the appropriate torque force and rotate the floating platform 210 in the desired direction.

It will be understood that thrust 474 may additionally or alternatively be redirected using various control surfaces located on the aerial vehicle 470. For example, the hybrid drives 472a and/or 472b may include controllable nozzles configured to redirect a direction of the thrust 474. In other embodiments, control surfaces along a main wing or a rotatable tail surface (e.g., a stabilator) of the aerial vehicle may be adjustable so as to redirect thrust 474 such that the thrust vector includes a non-zero horizontal component. As such, the control surfaces of the aerial vehicle 470 may be used in conjunction with the thrust 474 of the hybrid drive(s) to rotate the floating platform 210 in a desired manner.

III. Example Methods

Figure 5:
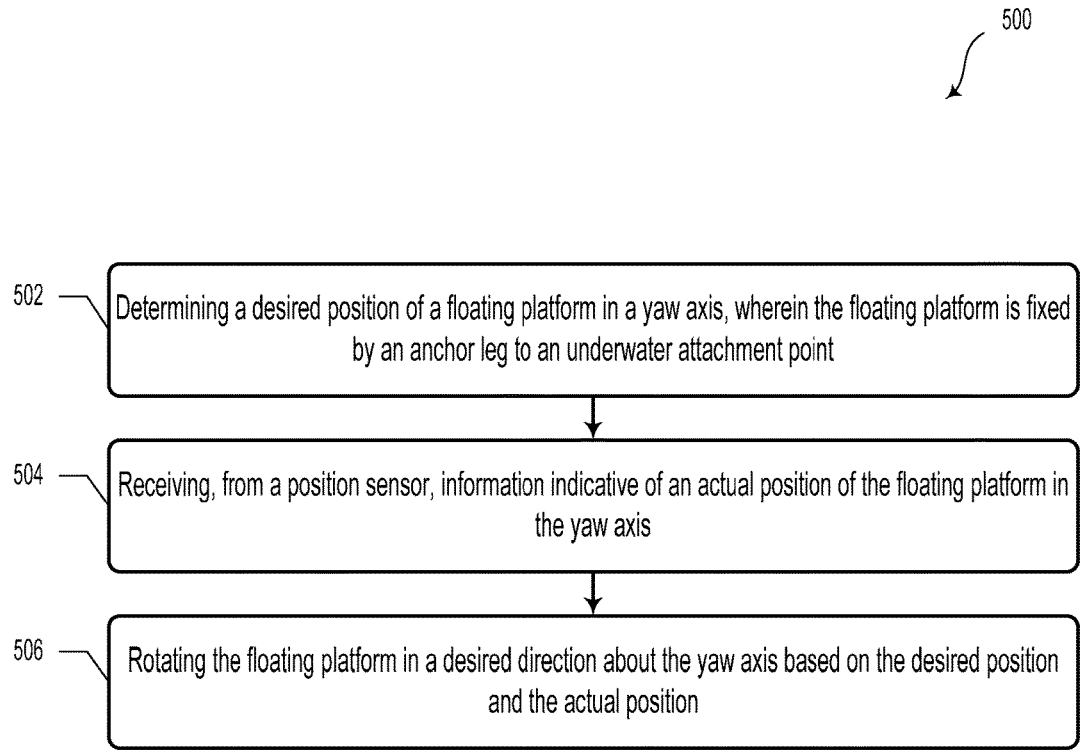
FIG. 5 illustrates a method including various blocks, according to an example embodiment.

FIG. 5 illustrates a method 500, according to an example embodiment. The method 500 may include various blocks or steps. The blocks or steps may be carried out individually or in combination. The blocks or steps may be carried out in any order and/or in series or in parallel. Further, blocks or steps may be omitted or added to method 500.

The blocks of method 500 may control, include, and/or involve elements of systems 100, 160, 200, 290, 300, 350, 400, 490, and/or 492 and scenarios 320, 330, and/or 340, as illustrated and described in reference to FIGS. 1A, 1B, 2A, 2B, 3A, 3B, 3C, 4A, 4B, and 4C. In some embodiments, some or all blocks of method 500 may be carried out by controller 150.

Block 502 includes determining a desired position of a floating platform in a yaw axis. The floating platform is fixed by an anchor leg to an underwater attachment point. The desired position may be expressed in degrees from a given reference angle or a number of rotations in a particular direction with regard to the yaw axis.

Block 504 includes receiving, from a position sensor, information indicative of an actual position of the floating platform in the yaw axis. As described herein the position sensor may include a rotation sensor or another type of sensor configured to provide information about an actual rotational position of the floating platform. In some instances, the position sensor may provide information about how an underwater cable is tangled or wrapped around the anchor leg.

Block 506 includes rotating the floating platform in a desired direction about the yaw axis based on the desired position and the actual position. The rotation of the floating platform may be performed using "active" or "passive" methods, as described elsewhere herein. For example, the floating platform may be rotated using one or more aerodynamic and/or hydrodynamic drag/lift members. Additionally or alternatively, the floating platform can be rotated using an aerial vehicle to generate a downward or horizontal prop wash force. Each such method, and variations thereof, is contemplated herein.

In example embodiments, the floating platform may include a yaw member and a corresponding actuator. The floating platform may also include an environmental sensor. In such scenarios, the method may optionally include receiving, from the environmental sensor, information indicative of at least one of: a wind condition or a hydrodynamic condition. The wind condition may include information indicative of an average wind direction (e.g., in degrees) and optionally information indicative of wind speed. For example, the wind condition can be received from a weather sensor on a floating platform or on an aerial vehicle. The wind condition may be obtained from other weather information sources.

The method may also optionally include determining, based on the received information, at least one of: a prevailing wind direction or a prevailing water current direction. In such a scenario, the method may also optionally include causing the actuator to adjust the yaw member based on at least one of: the prevailing wind condition or the prevailing water current direction.

In other examples, an aerial vehicle may be coupled to the floating platform. In such scenarios, the method optionally further includes causing the aerial vehicle to generate thrust. A thrust vector of the generated thrust includes a non-zero horizontal component. In such a scenario, the floating platform includes a yaw member. Rotating the floating platform in the desired direction comprises causing an aerial vehicle to generate a thrust force on the yaw member so as to rotate the floating platform in a desired direction with regard to the yaw axis.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   a floating platform fixed by an anchor leg to an underwater attachment point;
   a yaw member coupled to the floating platform by way of an actuator, wherein the yaw member is operable to convert an aerodynamic force on the yaw member into a rotational force on the floating platform about a yaw axis;
   a position sensor;
   an environmental sensor; and
   a controller, wherein the controller comprises a processor and a memory, and wherein the controller executes instructions stored in the memory so as to carry out operations, the operations comprising:
   determining a desired position of the floating platform in the yaw axis;

receiving, from the position sensor, information indicative of an actual position of the floating platform in the yaw axis;
receiving, from the environmental sensor, information indicative of a wind condition; and
based on the desired position, the actual position, and the wind condition, causing the actuator to move the yaw member, relative to the floating platform, to one or more target positions.

2. The system of claim 1, wherein the wind condition comprises a wind direction.

3. The system of claim 1, wherein the wind condition comprises a wind speed and a wind direction.

4. The system of claim 1, wherein moving the yaw member to the one or more target positions causes rotation of the floating platform in a desired direction about the yaw axis.

5. The system of claim 4, further comprising an underwater cable, wherein the underwater cable is initially at least partially wrapped around the anchor leg, and wherein the rotation of the floating platform in the desired direction about the yaw axis at least partially unwraps the underwater cable from the anchor leg.

6. The system of claim 1, wherein the floating platform comprises a spar buoy.

7. The system of claim 1, wherein the anchor leg is a single anchor leg mooring (SALM).

8. The system of claim 1, wherein the yaw member comprises a drag member.

9. The system of claim 1, wherein the yaw member comprises an aerodynamic lift member, wherein the aerodynamic lift member is an airfoil that generates a lift force.

10. The system of claim 1, wherein the position sensor comprises at least one of: a rotation sensor, a global positioning system, an inertial measurement unit, or a compass.

11. The system of claim 1, wherein the environmental sensor comprises at least one of: a wind gauge, a weather vane, or a pressure sensor.

12. The system of claim 1, wherein the yaw member is a first yaw member, wherein the actuator is a first actuator, wherein the system further comprises a second yaw member coupled to the floating platform by way of a second actuator, wherein the operations further comprise selecting, based on the wind condition, a target yaw member from the first and second yaw members, wherein causing the first actuator to move the first yaw member is based on the first yaw member being the selected target yaw member.

13. The system of claim 1, wherein the one or more target positions (i) cause rotation of the floating platform from the actual position to the desired position if the desired position is different from the actual position or (ii) maintain the actual position of the floating platform if the desired position is the actual position.

14. A system comprising:
a floating platform fixed by an anchor leg to an underwater attachment point;
a yaw member coupled to the floating platform by way of an actuator, wherein the yaw member is operable to convert a hydrodynamic force on the yaw member into a rotational force on the floating platform about a yaw axis;
a position sensor;
an environmental sensor; and
a controller, wherein the controller comprises a processor and a memory, and wherein the controller executes instructions stored in the memory so as to carry out operations, the operations comprising:
determining a desired position of the floating platform in the yaw axis;
receiving, from the position sensor, information indicative of an actual position of the floating platform in the yaw axis;
receiving, from the environmental sensor, information indicative of a hydrodynamic condition; and
based on the desired position, the actual position, and the hydrodynamic condition, causing the actuator to move the yaw member, relative to the floating platform, to one or more target positions.

15. The system of claim 14, wherein the hydrodynamic condition comprises a water current direction.

16. The system of claim 14, wherein the hydrodynamic condition comprises water current speed and a water current direction.

17. The system of claim 14, wherein moving the yaw member to the one or more target positions causes rotation of the floating platform in a desired direction about the yaw axis.

18. The system of claim 17, further comprising an underwater cable, wherein the underwater cable is initially at least partially wrapped around the anchor leg, and wherein the rotation of the floating platform in the desired direction about the yaw axis at least partially unwraps the underwater cable from the anchor leg.

19. The system of claim 14, wherein the floating platform comprises a spar buoy.

20. The system of claim 14, wherein the anchor leg is a single anchor leg mooring (SALM).

21. The system of claim 14, wherein the yaw member comprises a drag member.

22. The system of claim 14, wherein the yaw member comprises a hydrodynamic lift member, wherein the hydrodynamic lift member is a hydrofoil that generates a hydrodynamic lift force.

23. The system of claim 14, wherein the position sensor comprises at least one of: a rotation sensor, a global positioning system, an inertial measurement unit, or a compass.

24. The system of claim 14, wherein the environmental sensor comprises a pressure sensor.

25. The system of claim 14, wherein the yaw member is a first yaw member, wherein the actuator is a first actuator, wherein the system further comprises a second yaw member coupled to the floating platform by of a second actuator, wherein the operations further comprise selecting, based on the hydrodynamic condition, a target yaw member from the first and second yaw members, wherein causing the first actuator to move the first yaw member is based on the first yaw member being the selected target yaw member.

26. The system of claim 14, wherein the one or more target positions (i) cause rotation of the floating platform from the actual position to the desired position if the desired position is different from the actual position or (ii) maintain the actual position of the floating platform if the desired position is the actual position.

27. A system comprising:
a floating platform fixed by an anchor leg to an underwater attachment point;
a position sensor;
an aerial vehicle;
a yaw member coupled to the floating platform; and
a controller, wherein the controller comprises a processor and a memory, and wherein the controller executes instructions stored in the memory so as to carry out operations, the operations comprising:

determining a desired position of the floating platform in a yaw axis;

receiving, from the position sensor, information indicative of an actual position of the floating platform in the yaw axis; and based on the desired position and the actual position, causing the aerial vehicle to generate a downward thrust force on the yaw member, wherein the yaw member is operable to convert the downward thrust force on the yaw member into a rotational force on the floating platform about the yaw axis.

28. The system of claim 27, wherein the rotational force on the floating platform is in a desired direction about the yaw axis.

29. The system of claim 27, further comprising an underwater cable, wherein the underwater cable is initially wrapped around the anchor leg, and wherein the rotational force causes rotation of the floating platform in the desired direction to at least partially unwrap the underwater cable from the anchor leg.

30. The system of claim 27, wherein the rotational force (i) causes rotation of the floating platform from the actual position to the desired position if the desired position is different from the actual position or (ii) maintains the actual position of the floating platform if the desired position is the actual position.

31. A method comprising:

determining a desired position of a floating platform in a yaw axis, wherein the floating platform is fixed by an anchor leg to an underwater attachment point, and wherein a yaw member is coupled to the floating platform;

receiving, from a position sensor, information indicative of an actual position of the floating platform in the yaw axis; and based on the desired position and the actual position, causing an aerial vehicle to generate a downward thrust force on the yaw member, wherein the yaw member is operable to convert the downward thrust force on the yaw member into a rotational force on the floating platform in a desired direction about the yaw axis.

32. The method of claim 31, wherein the yaw member is coupled to the floating platform by way of an actuator, wherein the floating platform comprises an environmental sensor, and wherein the method further comprises:

receiving, from the environmental sensor, information indicative of at least one of: a wind condition or a hydrodynamic condition;

determining, based on the received information, at least one of: a prevailing wind direction or a prevailing water current direction; and causing the actuator to move the yaw member, relative to the floating platform, to one or more target positions based on at least one of: the prevailing wind condition or the prevailing water current direction.

33. The method of claim 31, wherein an underwater cable is initially wrapped around the anchor leg, and wherein the rotational force causes rotation of the floating platform in the desired direction to at least partially unwrap the underwater cable from the anchor leg.

34. The method of claim 31, wherein the rotational force (i) causes rotation of the floating platform from the actual position to the desired position if the desired position is different from the actual position or (ii) maintains the actual position of the floating platform if the desired position is the actual position.

* * * * *